United States Patent Office 3,257,403
Patented June 21, 1966

3,257,403
4-SUBSTITUTED 1,2-DIARYL-3,5-DIOXO-PYRAZOLIDINES
Rudolf Pfister and Franz Häfliger, Basel, Switzerland, assignors to Geigy Chemical Corporation, Ardsley, N.Y., a corporation of Delaware
No Drawing. Continuation of application Ser. No. 89,928, Feb. 17, 1961. This application Feb. 4, 1963, Ser. No. 256,157
Claims priority, application Switzerland, Feb. 18, 1960, 1,817/60
8 Claims. (Cl. 260—268)

This application is a continuation of our co-pending application Serial No. 89,928, filed February 17, 1961, and now abandoned.

The present invention concerns new derivatives of 1,2-diphenyl-3,5-dioxo-pyrazolidines and their salts with inorganic and organic bases having valuable pharmaceutical properties.

It has been found that 4-substituted 1,2-diaryl-3,5-dioxopyrazolidines of the general formula

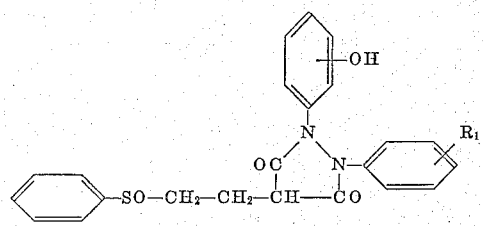
I wherein $R_1$ represents hydrogen, methyl or chlorine,
or the tautomeric forms thereof and their salts with inorganic and organic bases have a valuable and prolonged uricosuric action and, at the same time, slight toxicity. They are useful, for example, for the treatment of gout and of rheumatic complaints and for this purpose they can be administered per os or rectally or, in the form of aqueous solutions of their salts, or also parenterally, e.g. intramuscularly or intravenously.

The new compounds of the general Formula I are produced by condensing, in the presence of an alkaline condensing agent, malonic acid diesters of the general formula

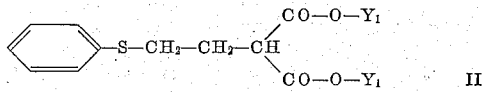
II wherein $Y_1$ represents a hydrocarbon radical, in particular a low molecular alkyl radical
with a derivative of a hydroxy-hydrazobenzene of the general formula

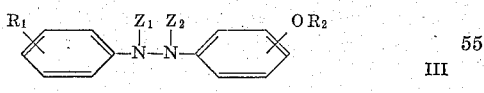
III wherein $R_2$ represents a lower α-alkoxy-alkyl radical in which the alkoxy and the alkyl group can also be bound together to form a ring, and
one of the symbols $Z_1$ and $Z_2$ represents hydrogen and the other represents hydrogen or an acyl radical which can easily be split off, and
$R_1$ has the meaning given above; or by reacting, in the presence of an acid binding agent, a malonic acid derivative of the general formula

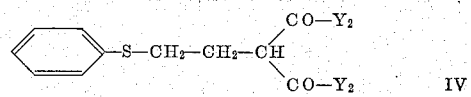
IV wherein $Y_2$ represents chlorine, bromine or an acetoxy radical,
with a derivative of a hydroxy-hydrazobenzene of the general formula

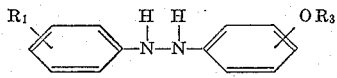
V wherein
$R_3$ represents an acyl radical which is easily split off or a radical as defined for $R_2$, and
$R_1$ has the meaning given above;
or finally, by reacting, in the presence of an acid binding agent, a malonic acid ester derivative of the general formula

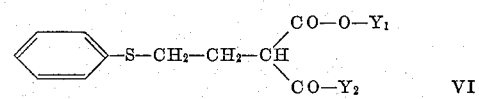
VI wherein $Y_1$ and $Y_2$ have the meaning given above, with a derivative of a hydroxy-hydrazobenzene of the general Formula III and treating the reaction product so obtained with an alkaline condensing agent. The mercapto compound, obtained by one of the three modifications of the process mentioned above, of the general formula

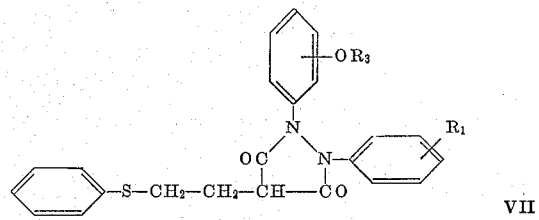
VII wherein $R_1$ and $R_3$ have the meanings given above, is converted by hydrolysis and oxidation into a compound of the general Formula I and the latter, if desired, is converted into a salt with an inorganic or organic base.

Compounds of the general Formula I are obtained by a further modified process by condensing substituted malonic acids of the general formula

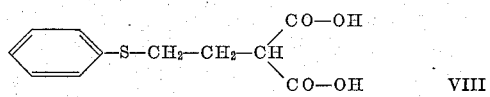
VIII and compounds of the general formula

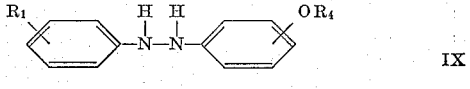
IX wherein
$R_4$ represents hydrogen, an acyl radical which is easily split off or an α-alkoxy-alkyl radical wherein the alkoxy group and the alkyl group can also be bound together to form a ring, and
$R_1$ has the meaning given above, by means of an N,N'-disubstituted carbodi-imide, in particular N,N'-dicyclohexyl carbodi-imide and hydrolysing the condensation product so obtained if necessary depending on the meaning of $R_4$, to form a thio-analog compound of the general Formula I. In this case too, the mercapto group can be oxidized to a sulfinyl either before or after any hydrolysis necessary. However, in contrast to the previous processes, by ring closure compounds of general Formula I are obtained direct.

In the formulae of the starting materials given above, $Y_1$ is advantageously the ethyl or methyl radical; also, for example, the n-butyl radical, cyclohexyl radical, phenyl radical or benzyl radical. If either $Z_1$ or $Z_2$ is not hydrogen, then one of them is advantageously the acetyl radical. Homogeneous starting materials with regard to the position thereof are not absolutely necessary. In the general Formula III, $R_2$ is advantageously the tetrahydropyranyl-(2) radical, but radicals can also be used which, together with the oxygen atom, produce an open acetal grouping such as, e.g. the methoxymethyl radical, α-methoxyethyl radical and the α-ethoxyethyl radical. $R_3$ in general Formula V is advantageously an acetyl radical or one of the radicals given for $R_2$. This is also true of $R_4$ in the general Formula IX but this symbol can just as well be hydrogen.

The malonic acid diesters of the general Formula II are condensed with the hydrazobenzene derivatives of the general Formula III advantageously in organic solvents such as benzene, toulene, xylene, butanol or dibutyl ether at raised temperatures e.g. between 80 and 160° C. it being possible continuously to distil off the alcohol liberated. In general, alkaline condensing agents which are suitable for this reaction are those which are capable of replacing a mobile hydrogen atom by a metal atom, for example, alkali metals or alcoholates, amides, hydrides thereof and metal organic compounds such as sodium, potassium, lithium, sodium alcoholate, potassium alcoholate, sodium amide, lithium amide, sodium hydride, lithium hydride, phenyllithium and methyl lithium.

In particular, tertiary organic bases such as pyridine, dimethyl aniline, triethyl amine or tributyl amine, in the presence or absence of additional organic solvents such as chloroform, diethyl ether or di-isopropyl ether are suitable as acid binding agents for the reaction of malonic acid derivatives of the general Formula IV with hydrazobenzene derivatives of general Formula V. In this case, the ring is closed already at low temperatures, e.g. between 0° and room temperature.

Instead of performing the condensation in the presence of an acid binding agent, those agents which are suitable for replacing the hydrogen atoms at the N atom of the hydrazobenzene derivatives by metal atoms such as, e.g. methyl lithium or ethyl magnesium bromide, can also be reacted immediately before the condensation with the hydrazobenzene derivatives to form, for example, N,N'-dilithium compounds or N,N'-bis-magnesium bromide compounds which are then reacted with malonic acid derivatives of the general Formula IV.

Dilute hydrochloric acid in methanol at a moderately raised to boiling temperature is suitable for example for the hydrolysis of condensation products which contain a radical $R_2$, and for the hydrolysis of compounds containing an acyl radical $R_3$, for example dilute caustic soda lye in the same temperature range is suitable.

As oxidising agent, both for use with compounds having a protected hydroxyl group as well as with those having a free hydroxyl group, i.e. for the oxidation either before or after hydrolysis, in particular hydrogen peroxide in a solvent such as, e.g. glacial acetic acid is used. The mercapto group is oxidised to the sulphinyl group at room temperature.

The ring closure between a substituted malonic acid of the general Formula VIII and a hydrazobenzene derivative of the general Formula IX is completed by treatment with, for example, N,N'-dicyclohexyl carbodi-imide in an inert organic solvent, advantageously a solvent in which the starting materials and the reaction product dissolve well but in which N,N'-dicyclohexyl urea does not dissolve well, such as e.g. dioxan. Ring closure is performed already at room temperature.

Starting materials of the general Formula II can be easily produced by condensing malonic acid diesters with possibly substituted phenyl thioalkyl halides by means of alkali metals or alcoholates. The substituted malonic acids of the general Formula VIII are obtained therefrom by hydrolysis. These substituted malonic acids can be converted by treatment with inorganic acid halides such as thionyl chloride, or with acetanhydride and sulphuric acid, into starting materials of the general Formula IV.

For the production of starting materials of the general Formulae III and V, advantageously free hydroxy-hydrazobenzenes are not used, but rather the formation of the acetal grouping or the esterification is performed already in the azo step. Acetal derivatives of hydroxy-azobenzenes are obtained, for example, by heating hydroxy-azobenzenes in dihydropyrane in the presence of a trace of phosphorous pentoxide or by reacting hydroxy-azobenzenes with a vinyl ether in the presence of a trace of hydrogen chloride or by reacting sodium azophenolates in an inert solvent such as, e.g. benzene, with chloromethyl alkyl ethers. The acetal derivatives of hydroxy-azobenzenes obtained are reduced to those of hydroxy-hydrazobenzenes advantageously in a neutral or alkaline medium, e.g. by means of zinc dust in alcoholic sodium hydroxide solution.

The usual acylating methods can serve for the esterification of hydroxy-azobenzenes, e.g. treatment with an acid anhydride in the presence of sodium acetate or with an acid chloride in aqueous alkali lye or in pyridine. The reduction of the acyloxy-azobenzenes must be performed in a medium as nearly neutral as possible, for example, by placing the acyloxy-azobenzene and zinc dust in a suitable solvent and slowly adding dropwise the glacial acetic acid while stirring until the solution becomes colourless and then immediately filtering off the zinc. The esters of hydroxy-azobenzenes can also be converted into the corresponding hydrazobenzene derivatives by catalytic hydrogenation. Here, however, care must be taken to ensure that the reaction is broken off promptly after one mol of hydrogen has been taken up in order to avoid splitting the hydrazobenzenes into the corresponding amines.

Starting materials of the general Formula IX wherein $R_4$ is hydrogen can be obtained, for example, by direct reduction of the corresponding hydroxy-azobenzenes by one of the methods given above as well as by catalytic hydrogenation. The other starting materials embraced by Formula IX are identical with those of the general Formulae III and V.

In solution, the new compounds of Formula I occur in tautomeric forms of the formulae:

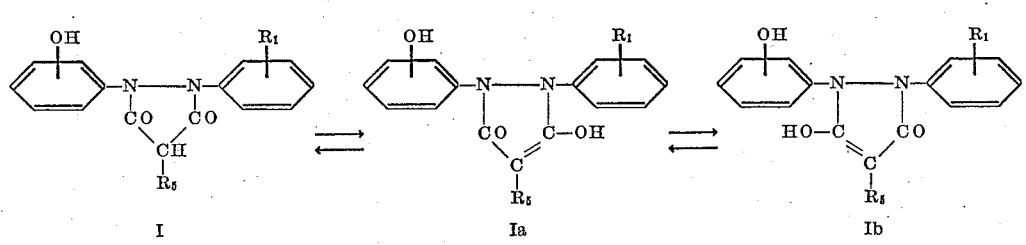

wherein $R_5$ represents the radical

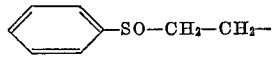

The new compounds form salts in which the mesomeric anion occurs in the following contributing structures:

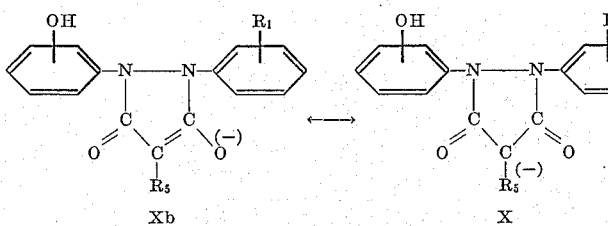 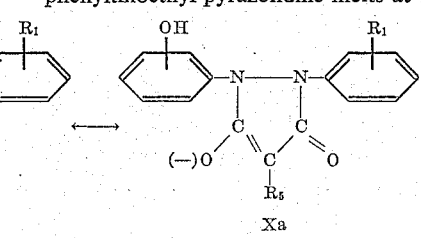

wherein $R_5$ has the meaning given above.

The monobasic salts formed with alkali metal hydroxides are fairly easily to easily soluble in water. The solutions can be produced direct by dissolving the new compounds in the calculated amount of alkali lye, i.e. in solutions of lithium, sodium or potassium hydroxide. Most of the new compounds also dissolve in alkali hydrogen carbonate solutions. Because of this latter fact as well as from comparisons with analogous compounds not containing a phenolic hydroxyl group, it can be concluded that the monobasic salts are formed under replacement of the hydrogen atom of the pyrazolidine ring. The new compounds or the pharmaceutically acceptable alkali metal salts thereof or their pharmaceutically acceptable salts with organic bases such as dimethylaminoethanol, diethylaminoethanol or piperazine produced according to the invention can be converted into medicaments by combination with suitable pharmaceutical carriers. The solutions of the alkali metal salts of the new compounds described above have a neutral to weakly alkaline reaction and are suitable, therefore, for injection. The medicaments can also be in the form of capsules, powders, tablets and other forms suitable for administration per os. They can be produced, for example, by mixing the active ingredients, i.e. the new substituted 1,2-diphenyl-3,5-dioxo-pyrazolidines, with pharmaceutical carriers such as starch, lactose, stearic acid, talcum, magnesium stearate etc. They can also be incorporated into semi-solid substances which melt within a suitable range, for example, cocoa butter, to form suppositories.

The following examples further illustrate the production of the new compounds. Parts are given therein as parts by weight and their relationship to parts by volume is as grammes to cubic centimetres. The temperatures are in degrees centigrade.

EXAMPLE 1

(a) 163 parts of phenyl thioethyl malonic acid (M.P. 154°) are added at room temperature while stirring to 500 ml. of thionyl chloride. The mixture is heated overnight at 40–50° while excluding moisture and then the excess thionyl chloride is distilled off at 11 Torr and a bath temperature of 50° until the residue weighs 182 parts. 364 parts of alcohol-free chloroform are added and the solution obtained is added dropwise at 0–5° to a mixture, which is being stirred, of 165 parts of p-acetoxy-hydrazobenzene (Helv. 40, 395 (1957)), 220 parts by volume of anhydrous pyridine and 880 parts by volume of anhydrous chloroform and the reaction mixture is left to stand overnight at room temperature. It is then stirred into 1000 parts by volume of ice water and the chloroform phase, in the presence of ice, is extracted twice with 500 parts by volume of 1 N-hydrochloric acid each time and with 680 parts by volume of 1 N-hydrogen carbonate solution each time and four times with 680 parts by volume of 1 N-sodium carbonate solution each time. The combined extracts, in the presence of ice and while stirring, are made acid to Congo red paper with 12 N-hydrochloric acid and the oil which separates is taken up in 500 parts by volume of ethyl acetate. The solution is dried over sodium sulphate and the solvent is distilled off in vacuo at 40°. The residue is crystallised from ethyl acetate with the addition of petroleum ether. The 1-phenyl-2-(p-acetoxy-phenyl)-3,5-dioxo-4-phenylthioethyl-pyrazolidine melts at 118–119°.

(b) 67 parts of the above product are dissolved in 336 parts by volume of glacial acetic acid and, at 25°, a solution of 17 parts by volume of 30% hydrogen peroxide solution in 330 parts by volume of glacial acetic acid is added dropwise and the whole is left to stand for about 14 hours at room temperature. The glacial acetic acid is then distilled off as completely as possible at 11 Torr and 30–40° bath temperature. The residue is taken up in 600 parts by volume of water and 600 parts by volume of ethyl acetate at 0–5°. The organic phase is extracted three times with ice water, dried over sodium sulphate and concentrated at 30° and 11 Torr. The new compound cannot be crystallised so that it is saponified direct. The residue is dissolved in 750 parts by volume of 2 N-caustic soda lye and heated for 30 minutes at 90–95°. The solution is filtered with charcoal, the filtrate is made acid to Congo red paper with 12 N-hydrochloric acid at room temperature in the presence of 900 parts by volume of ethyl acetate and is extracted twice with water and three times with 300 parts by volume of 0.5 N-hydrogen carbonate solution each time. The latter extracts are combined and again made acid to Congo red paper in the presence of ethyl acetate. The organic phase is dried over sodium sulphate and then concentrated at 11 Torr and 30°. The residue is dissolved in two parts of glacial acetic acid, 4 parts of ethyl acetate are added whereupon the 1-phenyl-2-(p-hydroxyphenyl)-3,5-dioxo-4-phenylsulphinylethyl-pyrazolidine crystallises out; melting point 183°.

In an analogous manner: 1-(p-methylphenyl)-2-(p'-hydroxyphenyl)-3,5-dioxo-4-phenylsulphinylethyl-pyrazolidine, (M.P. 108° from dioxan) is obtained from p-methyl-p'-acetoxy-hydrazobenzene (M.P. 98°, from methanol); 1-(m-methylphenyl)-2-(p'-hydroxyphenyl)-3,5-dioxo-4-phenylsulphinylethyl-pyrazolidine, M.P. 189° (from methanol) is obtained from m-methyl-p'-acetoxy-hydrazobenzene (M.P. 126°, from methanol); 1-(p-chlorophenyl) - 2-(p'-hydroxyphenyl)-3,5-dioxo-4-phenylsulphinylethyl-pyrazolidine, M.P. 134° (from ethanol) is obtained from p-chloro-p'-acetoxy-hydrazobenzene (M.P. 98°, from methanol); and 1-(m-chlorophenyl)-2-(p'-hydroxyphenyl) - 3,5-dioxo-4-phenylsulphinylethyl-pyrazolidine, M.P. 190° under decomposition (from methanol) is obtained from m-chloro-p'-acetoxy-hydrazobenzene (M.P. 107°, from 80% methanol).

(c) Instead of oxidising the mercapto compound obtained according to (a), this can also be hydrolysed direct. In this manner, from 1-phenyl-2-(p-acetoxyphenyl)-3,5-dioxo-4-phenylthioethyl-pyrazolidine by the hydrolysis process described under (b), 1-phenyl-2-(p-hydroxyphenyl)-3,5-dioxo-4-phenylthioethyl-pyrazolidine is obtained, M.P. 92° (from ether/petroleum ether), from 1-(p-methylphenyl) - 2-(p'-acetoxyphenyl)-3,5-dioxo-4-phenyl-thioethyl-pyrazolidine (M.P. 120°, from ethyl acetate/petroleum ether) 1-(p-methylphenyl)-2-(p'-hydroxyphenyl)-3,5-dioxo-4-phenylthioethyl-pyrazolidine is obtained, M.P. 73° (from isopropanol); from 1-(m-methylphenyl)-2 - (p'-acetoxyphenyl)-3,5-dioxo-4-phenylthioethyl-pyrazolidine (M.P. 120°, from methanol), 1-(m-methyl-2-(p'-acetoxyphenyl) - phenyl)/ - 3,5-dioxo-4-phenylthioethyl-pyrazolidine, M.P. 119° (from isopropanol) is obtained; from 1-(p-chlorophenyl)-2-(p'-acetoxyphenyl)-3,5-dioxo-4-phenylthioethyl-pyrazolidine (M.P. 122°, from alcohol), 1 - (p-chlorophenyl)-2-(p'-hydroxyphenyl)-3,5-dioxo-4-phenylthioethyl-pyrazolidine is obtained, M.P. 134° (from ethanol); and from 1-(m-chlorophenyl)-2-(p'-acetoxyphenyl)-3,5-dioxo-4-phenylthioethyl-pyrazolidine (oil), 1-(m - chlorophenyl) - 2-(p'-hydroxyphenyl)-3,5-dioxo-4-phenylthioethyl-pyrazolidine is obtained, M.P. 57° (from ether, contains 1 molecule of crystal ether).

EXAMPLE 2

2.56 parts of phenylsulphinylethyl malonic acid are dissolved in 50 parts by volume of dioxan, 2.7 parts of p-acetoxyhydrazobenzene are added and 4.5 parts of dicyclohexyl carbo-di-imide are added all at once to the clear solution. The whole is kept for 12 hours at room temperature. Undissolved substance (dicyclohexyl urea) is filtered off under suction and the filtrate is concentrated at 11 Torr. The residue is dissolved in 100 parts by volume of ethyl acetate and extracted twice with 50 parts by volume of 1 N-hydrogen carbonate solution each time. The extracts are made acid to Congo red paper and the oil which separates is dissolved in ethyl acetate, the solution is dried with sodium sulphate and concentrated at 11 Torr. The 1-phenyl-2-(p-acetoxyphenyl)-3,5-dioxo-4-phenylsulphinylethyl-pyrazolidine is an oil from which, after hydrolysis analogous to Example 1, 1-phenyl-2-(p-hydroxyphenyl)-3,5-dioxo - 4 - phenylsulphinylethyl-pyrazolidine is obtained. It melts at 183°. (This process is especially well suited for the condensation of optically active phenylsulphinylethyl malonic acids.)

EXAMPLE 3

56.4 parts of p-[tetrahydropyranyl-(2)-oxy]-azobenzene (M.P. 81°) are dissolved in 564 parts by volume of benzene at 70°, and this solution is floated on a phase of 200 parts by volume of 4 N-caustic soda lye. 40 parts of zinc dust are gradually added while stirring in an atmosphere of nitrogen and the reaction mixture is kept for 5 hours at 70° whereby the solution becomes colourless. The benzene phase is separated in an atmosphere of nitrogen, dried over sodium sulphate and about 200 parts by volume thereof are distilled off. 59.2 parts of phenylthioethyl malonic acid diethyl ester and then a solution of 4.6 parts of sodium in 92 parts by volume of ethanol are then added while distillation with stirring is continued. After the further addition of 200 parts by volume of xylene, distillation is continued for 12 hours at a bath temperature of 140°. The product is worked up as described in Example 2, only the necessary amount of acetic acid is used for the acidification instead of hydrochloric acid. The 1-phenyl-2-(p-tetrahydropyranyl-2-oxy)-3,5-dioxo-4-phenylthioethyl-pyrazolidine is crystallised from methanol. It melts at 112°. To liberate the hydroxyl group, 2.1 parts are dissolved in 42 parts by volume of methanol and 4.3 parts by volume of 1 N-hydrochloric acid are added whereupon the mixture is refluxed for 30 minutes. 4.3 parts by volume of 1 N-caustic soda lye are then added at room temperature after which it is concentrated in vacuo at 40°. The residue is distributed between 42 parts by volume of ethyl acetate and 42 parts by volume of water, the ethyl acetate solution is dried with sodium sulphate and concentrated. The residue is dissolved in 5 parts by volume of ether and the solution is injected with a crystallised substance. The 1 - phenyl - 2 - (p - hydroxyphenyl) - 3,5 - dioxo - 4-phenylthioethyl-pyrazolidine crystallises out and then melts at 92°.

EXAMPLE 4

5.13 parts of crystallised 1-(m-chlorophenyl)-2-(p-hydroxyphenyl) - 3,5 - dioxo - 4 - phenylthioethyl - pyrazolidine which contains an equimolar amount of crystal ether (M.P. 57°) are dissolved in 50 parts by volume of glacial acetic acid and the solution is somewhat concentrated at 11 Torr to remove the ether. 1.13 parts of 30% hydrogen peroxide solution are added at 25° and the reaction mixture is kept for 12 hours at room temperature. The solvent is distilled off as completely as possible at 11 Torr and the residue is recrystallised from methanol. The 1 - (m - chlorophenyl) - 2 - (p - hydroxyphenyl) - 3,5-dioxo-4-phenylsulphinylethyl-pyrazolidine melts at 190° on decomposition.

What we claim is:

1. 1 - phenyl - 2 - (p - hydroxyphenyl) - 3,5 - dioxo - 4-phenylsulphinylethyl-pyrazolidine.
2. 1 - (p - methylphenyl) - 2 - (p' - hydroxyphenyl)-3,5-dioxo-4-phenylsulphinylethyl-pyrazolidine.
3. 1 - (m - methylphenyl) - 2 - (p' - hydroxyphenyl)-3,5-dioxo-4-phenylsulphinylethyl-pyrazolidine.
4. 1 - (p - chlorophenyl) - 2 - (p' - hydroxyphenyl)-3,5-dioxo-4-phenylsulphinylethyl-pyrazolidine.
5. 1 - (m - chlorophenyl) - 2 - (p' - hydroxyphenyl)-3,5-dioxo-4-phenylsulphinylethyl-pyrazolidine.
6. A member selected from the group consisting of a compound of the formula

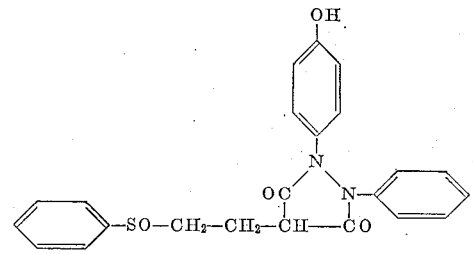

and a pharmaceutically acceptable salt thereof.

7. A member selected from the group consisting of a compound of the formula

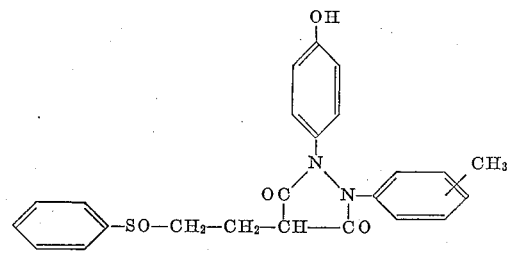

and a pharmaceutically acceptable salt thereof.

8. A member selected from the group consisting of a compound of the formula

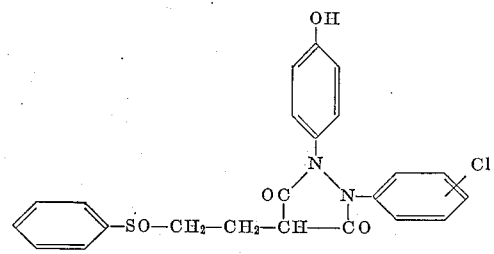

and a pharmaceutically acceptable salt thereof.

References Cited by the Examiner

UNITED STATES PATENTS 2,859,211  11/1958  Pfister et al. _____ 260—310

FOREIGN PATENTS 775,925  5/1957  Great Britain.

OTHER REFERENCES

Burns et al.: Jour. Pharmacol. Exper. Therap., volume 119, pages 418–26 (1957).

Burns et al.: Nature, volume 182, pages 1162–63 (1958).

WALTER A. MODANCE, *Primary Examiner.*

NICHOLAS S. RIZZO, *Examiner.*

NATALIE TROUSOF, *Assistant Examiner.*